United States Patent
Orrange

(10) Patent No.: US 6,663,699 B2
(45) Date of Patent: Dec. 16, 2003

(54) SCRATCH REMOVAL COMPOSITION AND METHOD

(76) Inventor: Timothy Orrange, 902 McClintock St., Longwood, FL (US) 32750

( * ) Notice: Subject to any disclaimer, the term of this patent is extended or adjusted under 35 U.S.C. 154(b) by 243 days.

(21) Appl. No.: 09/986,546

(22) Filed: Nov. 8, 2001

(65) Prior Publication Data

US 2003/0084819 A1 May 8, 2003

(51) Int. Cl.$^7$ ................................................ C09G 1/18
(52) U.S. Cl. ........................................ 106/9; 106/250
(58) Field of Search ..................................... 106/9, 250

(56) References Cited

U.S. PATENT DOCUMENTS

| | | |
|---|---|---|
| 3,808,032 A | 4/1974 | Bosco |
| 3,904,791 A | 9/1975 | Iverson et al. |
| 4,477,282 A | 10/1984 | Fernandez |
| 4,525,521 A | 6/1985 | DenHartog et al. |
| 5,045,113 A | 9/1991 | Grant |
| 5,137,541 A | 8/1992 | Foster |
| 5,266,088 A | 11/1993 | Sandusky et al. |
| 5,480,680 A | 1/1996 | Vieyra |

Primary Examiner—David Brunsman
(74) Attorney, Agent, or Firm—Edward M. Livingston, Esq.

(57) ABSTRACT

A composition of linseed oil and teak oil is used in a process to remove scratches from painted and coated surfaces of items, such as an automobile. The composition may include additional ingredients, such as citrus concentrate, to help remove or reduce the oily odor of the composition. After cleaning and drying the surface where a scratch exists, the composition is rubbed over the scratch and then any excess is removed by rubbing it with a moist cloth and then allowing the surface to dry.

12 Claims, No Drawings

SCRATCH REMOVAL COMPOSITION AND METHOD

BACKGROUND OF THE INVENTION

This invention relates to compositions for treating metal and wood surfaces and more particularly to a composition and method for removing or disguising scratches from automobiles, tables and other items.

Scratches and painted surfaces, such as automobiles, are difficult to disguise or remove. A scratch on a surface of an item, such as an automobile, is merely the absence of paint or coating which has been filled with air instead paint or coating. In order to remove the scratches it is necessary to replace the air with a composition or substance so that the scratch is not visible. Conventionally, if a scratch is minor it can be touched up with paint. Unfortunately, such a touch up usually shows. Another conventional method for removing a scratch is to sand and buff the surfaces and fill the scratch with a rubbing compound and polish. Again, unfortunately, the compound or wax usually makes the scratch even more visible. Thus, in most cases only an expensive and professional repainting of an entire panel on which the scratch exists can remove it.

The prior patented art includes the following relevant patents:

| U.S. Pat. No. | Inventor | Issue Date |
| --- | --- | --- |
| 5,480,680 | Vieyra | Jan. 2, 1996 |
| 5,266,088 | Sandusky, et al. | Nov. 30, 1993 |
| 5,137,541 | Foster | Aug. 11, 1992 |
| 5,045,113 | Grant | Sep. 3, 1991 |
| 4,525,521 | DenHartog, et al. | Jan. 25, 1985 |
| 4,477,282 | Fernandez | Oct. 16, 1984 |
| 3,904,791 | Iverson, et al. | Sep. 9, 1975 |
| 3,808,032 | Bosco | Apr. 30, 1974 |

None of the above patents disclose a composition and method of use to remove or disguise scratches in the manner of the present invention.

SUMMARY OF THE INVENTION

The primary object of the present invention is to provide a composition and method to disguise and eliminate scratches on painted surfaces of automobiles and other metal and wood articles.

Another object of the present invention is to provide such a composition and method that has long-lasting results.

A further object of the present invention is to provide such a use method for a composition that is easy to use.

An even further object of the present invention is to provide a scratch removal composition and method that is less time consuming than conventional scratch removal methods.

An additional object of the present invention is to provide such a composition that is relatively inexpensive, especially compared to conventional methods.

An even additional object of the present invention is to restore luster and color to faded surfaces caused by oxidation.

The present invention fulfills the above and other objects by providing a composition for removing scratches from painted and coated surfaces. The composition contains as primary active ingredients linseed oil and teak oil and may be combined with an odor eliminator, such as citrus concentrate. The linseed oil and teak oil are mixed in relatively equal proportions to form the composition. The odor eliminator, such as citrus concentrate, is added to the composition in a small amount to the linseed and teak oil. The method of use for the composition to remove scratches involves cleaning the surface on which the scratch exists by rubbing a wet cloth over it, then drying the scratch preferably using a dry cloth, rubbing the composition over the scratch, then removing any excess composition by rubbing a moist cloth over the surface and finally, drying the surface. Using this composition and method a scratch will disappear completely unless the scratch is very deep.

The above and other objects, features and advantages of the present invention should become even more readily apparent to those skilled in the art upon a reading of the following detailed description in conjunction with the drawings wherein there is shown and described illustrative embodiments of the invention.

DESCRIPTION OF THE PREFERRED EMBODIMENTS

The present invention involves a composition made from mixing two oils in relatively equal portions, those two oils being linseed oil and teak oil. An odor eliminator, such as citrus concentrate, is added to the composition to eliminate the oily smell of the concentration. A typical small amount of the mixture might consist of 60 milliliters of linseed oil mixed with 30 milliliters of teak oil and 1.5 milliliters, or twenty drops from an eye dropper, of citrus concentrate.

The primary active ingredients of the composition are the linseed oil and teak oil which help fill the scratch by displacing air in the scratch with a clear solution. Teak oil, which is used in the marine industry and is widely known for its water proof qualities, provides waterproofing qualities to the composition in order to prevent moisture from getting into the scratch and causing rust. The citrus concentrate eliminates or masks the oily smell of the composition during and after use. The composition is very easy to use and less time consuming than conventional methods of treating scratches.

First, the surface on which the scratch exists is cleaned, preferably by rubbing a moist cloth over it. Then the surface is dried by rubbing a dry cloth over the surface. Then the composition is rubbed over the scratch, the amount to be used depending on the gravity of the scratch. The excess composition is then removed by rubbing a moist cloth over the surface. Finally, the surface is dried by exposure to ambient air, rubbing it lightly with a dry cloth or by blowing air on it from a hair dryer.

The end result of using the composition and method of the present invention is a long lasting disguise or removal of the scratch on the surface of the automobile or other item which has been treated.

Although only a few embodiments of the present invention have been described in detail hereinabove, all improvements and modifications to this invention within the scope or equivalents of the claims are included as part of this invention.

Having thus described my invention, I claim:

1. A composition for removing scratches from painted or coated surfaces, said composition comprising:
   linseed oil and teak oil.

2. The composition of claim 1 further comprising:
   an additional ingredient which has oil odor eliminating properties.

3. The composition of claim 2 wherein the odor eliminating ingredient is citrus concentrate.

4. The composition of claim 3 wherein the linseed oil and teak oil are mixed in a one-to-one ratio.

5. The composition of claim 3 wherein the linseed oil, teak oil and citrus concentrate are mixed in the two-to-one-to-1/20 ratio, respectively.

6. The composition of claim 2 wherein the linseed oil and teak oil are mixed in a one-to-one ratio.

7. The composition of claim 1 wherein the linseed oil and teak oil are mixed in a one-to-one ratio.

8. A method for removal of scratches from painted and coated surfaces using a composition comprised of linseed oil and teak oil, said method comprising:

cleaning the surface on which the scratch exists by rubbing a wet cloth over it;

drying the surface using a dry cloth;

rubbing the composition over the scratch; and removing any excess composition by rubbing a moist cloth over the surface and drying the surface.

9. The method of claim 8 wherein the linseed oil and teak oil are mixed in a one-to-one ratio.

10. The method of claim 8 wherein the composition contains an odor eliminator.

11. The method of claim 10 wherein the odor eliminator is a citrus concentrate.

12. The method of claim 11 wherein the relative ratios of the linseed, teak oil and citrus concentrate are two-to-one-to 1/20, respectively.

* * * * *